(12) United States Patent
Sehgal

(10) Patent No.: US 8,108,452 B2
(45) Date of Patent: Jan. 31, 2012

(54) KEYWORD BASED AUDIO COMPARISON

(75) Inventor: Vivek Sehgal, Greenbelt, MD (US)

(73) Assignee: Yahoo! Inc., Sunnyvale, CA (US)

( * ) Notice: Subject to any disclaimer, the term of this patent is extended or adjusted under 35 U.S.C. 154(b) by 1430 days.

(21) Appl. No.: 11/370,321

(22) Filed: Mar. 7, 2006

(65) Prior Publication Data

US 2007/0162436 A1 Jul. 12, 2007

(30) Foreign Application Priority Data

Jan. 12, 2006 (IN) .............................. 95/DEL/2006

(51) Int. Cl.
*G06F 17/00* (2006.01)
*G06F 17/30* (2006.01)

(52) U.S. Cl. .................... 707/999.004; 707/E17.101

(58) Field of Classification Search ............... 707/E17.101–E17.103
See application file for complete search history.

(56) References Cited

U.S. PATENT DOCUMENTS

| | | | | |
|---|---|---|---|---|
| 5,918,223 | A * | 6/1999 | Blum et al. ........................... | 1/1 |
| 6,201,176 | B1 * | 3/2001 | Yourlo ............................ | 84/609 |
| 7,346,512 | B2 * | 3/2008 | Li-Chun Wang et al. ..... | 704/270 |
| 2002/0052870 | A1 * | 5/2002 | Charlesworth et al. ........... | 707/3 |
| 2002/0174101 | A1 * | 11/2002 | Fernley et al. .................... | 707/1 |
| 2004/0093354 | A1 * | 5/2004 | Xu et al. .................... | 707/104.1 |

OTHER PUBLICATIONS

Jonathan T. Foote, "Content-Based Retrieval of Music and Audio", Institute of Systems Science, National University of Singapore, Oct. 1997.
Keith D. Martin, et al., "Music Content Analysis through Models of Audition", MIT Media Laboratory Machine Listening Group, Cambridge, MA USA, presented at ACM Multimedia '98 Workshop on Content Processing of Music for Multimedia Applications, Bristol, UK, Sep. 12, 1998.

* cited by examiner

*Primary Examiner* — Samuel G Neway
(74) *Attorney, Agent, or Firm* — Hickman Palermo Truong & Becker LLP

(57) ABSTRACT

Keyword based audio data comparison. A method comprises extracting at least one feature from audio content of an audio data set to form feature arrays. The feature arrays may comprise a pitch array and a rhythm array. A set of keywords is formed for each feature array by performing the following for each feature array. Keywords are formed from overlapping sequences of values in the feature array, wherein each successive keyword comprises at least one value of a previous keyword and further comprises at least one value from the feature array that is not in the previous keyword. Another aspect audio is keyword-based audio data searching. Search keywords are formed from audio content. An index comprising sets of keywords formed from audio content of respective ones of audio data sets is searched using the search keywords formed from audio content of the specified audio data to identify audio data having similar audio content.

39 Claims, 4 Drawing Sheets

KEYWORD BASED AUDIO COMPARISON

FIELD OF THE INVENTION

The present invention relates to comparing audio data. In particular, the present invention relates to comparing audio data using keywords formed from audio content.

BACKGROUND

Being able to compare two or more sets of audio data has many uses. However, techniques that compare audio data suffer from a variety of problems. Some techniques are too computationally intensive to be suitable for applications requiring fast response time or that require a comparison of reference audio data with many other audio data sets. Other techniques trade off accuracy to achieve a relatively fast comparison.

One technique analyzes the audio data to produce a set of numeric values (vector) that can be used to classify and rank the similarity between individual audio files. However, this technique requires a computationally intensive distance comparison between the vector for the two files that are being compared. Moreover, the distance comparison only compares two files at a time.

Another technique generates templates for audio files and compares the templates to determine similarity. However, the comparison involves a computationally intensive distance measurement between two templates to compare two audio files. Moreover, the distance comparison only compares two files at a time.

A different approach involves text based comparisons based on metadata, anchor text, or song lyrics associated with the audio rather than a comparison based on the audio content. For example, audio data may have metadata that describes a song title, artist, genre, lyrics, etc. However, the effectiveness of comparing such metadata depends upon the richness and accuracy of metadata provided. Moreover, this approach faces a problem of whenever audio data is added to the search group, metadata may need to be entered manually. Manual intervention makes the metadata highly subjective, thus reducing comparison accuracy. Also, the textual information can be incomplete, wherein the comparison is not accurate. Further, this approach does not take into account the audio content of the audio data. Thus, audio data that may be very similar may be tagged with very different metadata. Furthermore, similar metadata does not necessarily imply similar audio content. Thus, a need exists for a technique to compare audio data that does not suffer from the limitations of the prior approaches.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Architecture Overview

Figure 1:
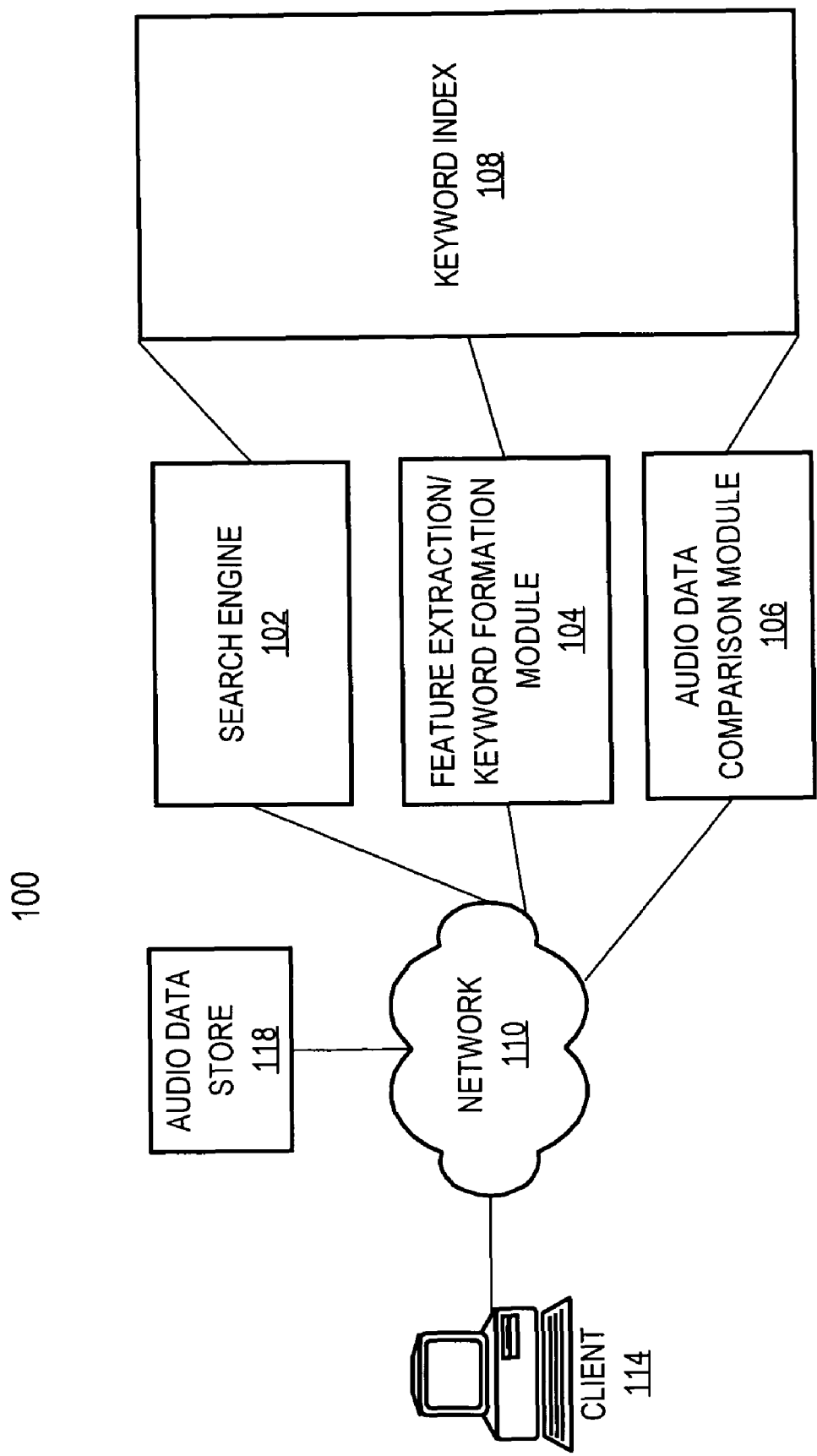
FIG. 1 depicts an architectural overview of a system for comparing audio data, based audio content, in accordance with an embodiment of the present invention.

FIG. 1 depicts an architectural overview of a system 100 for comparing audio data, based on audio content, in accordance with an embodiment of the present invention. The system 100 includes a search engine 102, feature extraction/keyword formation module 104, and audio data comparison module 106, which can be hosted on a server or other platform. The search engine 102, feature extraction/keyword formation module 104, and audio data comparison module 106 may be implemented by software, hardware, or a combination thereof.

The feature extraction/keyword formation module 104 extracts certain features from audio content of audio data to form keywords that can be used to search for similar audio data. Examples of features that are extracted include, but are not limited to, pitch, rhythm, and tempo. Other features may also be extracted. The keywords can be formed from audio content as opposed to forming the keywords based on metadata.

The audio data is typically organized as an audio data set. The audio data set is a basic unit for which a comparison is desired. For example, the audio data set may be a song, portion of a song, or in some cases more than one song. A set of keywords is formed for each audio data set. The audio data set may contain music, but is not limited to music. For example, the audio data set may be a song, a portion of a song, an audio channel of a video, speech, or sounds that are neither music nor speech. Examples of sounds that are neither music nor speech include, but are not limited to, sounds of nature such as sounds made by weather and animals and industrial or machine related sounds. Thus, a portion of a song may be processed to produce a set of keywords for the song, for example. The keywords may include pitch keywords, rhythm keywords, and tempo keywords. Other types of keywords may also be formed.

The keywords are stored in the keyword index 108. Therefore, the keyword index 108 contains a set of keywords for each of the audio data sets. The keywords from a number of audio data sets (e.g., songs) can be used to construct an index. The index may be searched using keywords formed from reference audio data for fast retrieval of similar audio data.

The audio data can be provided to the feature extraction module 104 in any convenient manner. For example, the search engine 102 can access audio data store 118 via the network 110 to locate audio files and provide them to the feature extraction module 104. Alternatively, a library of audio data is transferred to the feature extraction module 104 by, for example, an administrator.

The search engine 102 may receive a request from a user to search for audio data sets that are similar to reference audio data. For example, the search engine 102 receives a request that identifies a song. However, the request may identify other audio data, such as speech, a movie or a sound. The reference may be a textual identifier, such as a song title, movie title, title of spoken book, television show, etc. The reference could also identify an audio file. For example, the request may contain a hypertext link to the audio data. Alternatively, the audio data might be attached to the request as an MPEG file or other audio data file.

The search engine 102 provides either the audio reference or audio data specified by the audio reference to the feature extraction module 104, which extracts features and forms keywords therefrom. The keywords may be used to search the index 108 for audio data (e.g., an audio data set) that is similar to the reference audio data. For example, if a keyword from the reference audio data matches, or nearly matches, a keyword in the index, then the reference audio data may be similar to the audio data set associated with the matching keyword in the index. In one embodiment, the percentage of matching keywords is used to determine a degree of similarity. In one embodiment, if the percentage of matching keywords is great enough, the audio data comparison module 106 is invoked to determine a degree of similarity.

The audio data comparison module 106 may be used to determine a degree of similarity between two audio data sets (e.g., songs, portions thereof, speech). Comparing reference audio data with similar audio data sets can be used to rank the similar audio data sets. In one embodiment, the audio data comparison module 106 determines a distance between the keywords associated with the reference audio data and the keywords associated with one of the audio data sets of the similar audio data sets. To determine a distance, an embodiment in accordance with the present invention clusters keywords associated with two audio data sets and finds the statistical variance of each cluster. A separate cluster can be formed from pitch, rhythm, and tempo keywords.

Functional Overview

An embodiment in accordance with the present invention compares audio data based on the content of the audio data. Comparing audio data based on content involves extracting features from the audio content to form keywords, indexing and searching based on the keywords, and determining a distance between audio data to determine similarity.

An embodiment of the present invention is a computer-implemented method of processing audio data for keyword based searching. The method comprises extracting at least one feature from audio content of audio data to form feature arrays. The feature arrays may comprise a pitch array and a rhythm array. A set of keywords is formed for each feature array by performing the following steps for each feature array. Keywords are formed from overlapping sequences of values in the feature array, wherein each successive keyword comprises at least one value of a previous keyword and further comprises at least one value from the feature array that is not in the previous keyword.

Another embodiment of the present invention is a computer-implemented method of searching for audio data using keyword-based searching. In accordance with this embodiment, a request is received to identify audio data sets having similar audio content to audio data specified in the request. Search keywords are formed from audio content of the specified audio data. An index comprising sets of keywords formed from audio content of respective ones of audio data sets is searched using the search keywords formed from audio content of the specified audio data sets to identify audio data having similar audio content.

Feature Extraction/Keyword Formation

Figure 2:
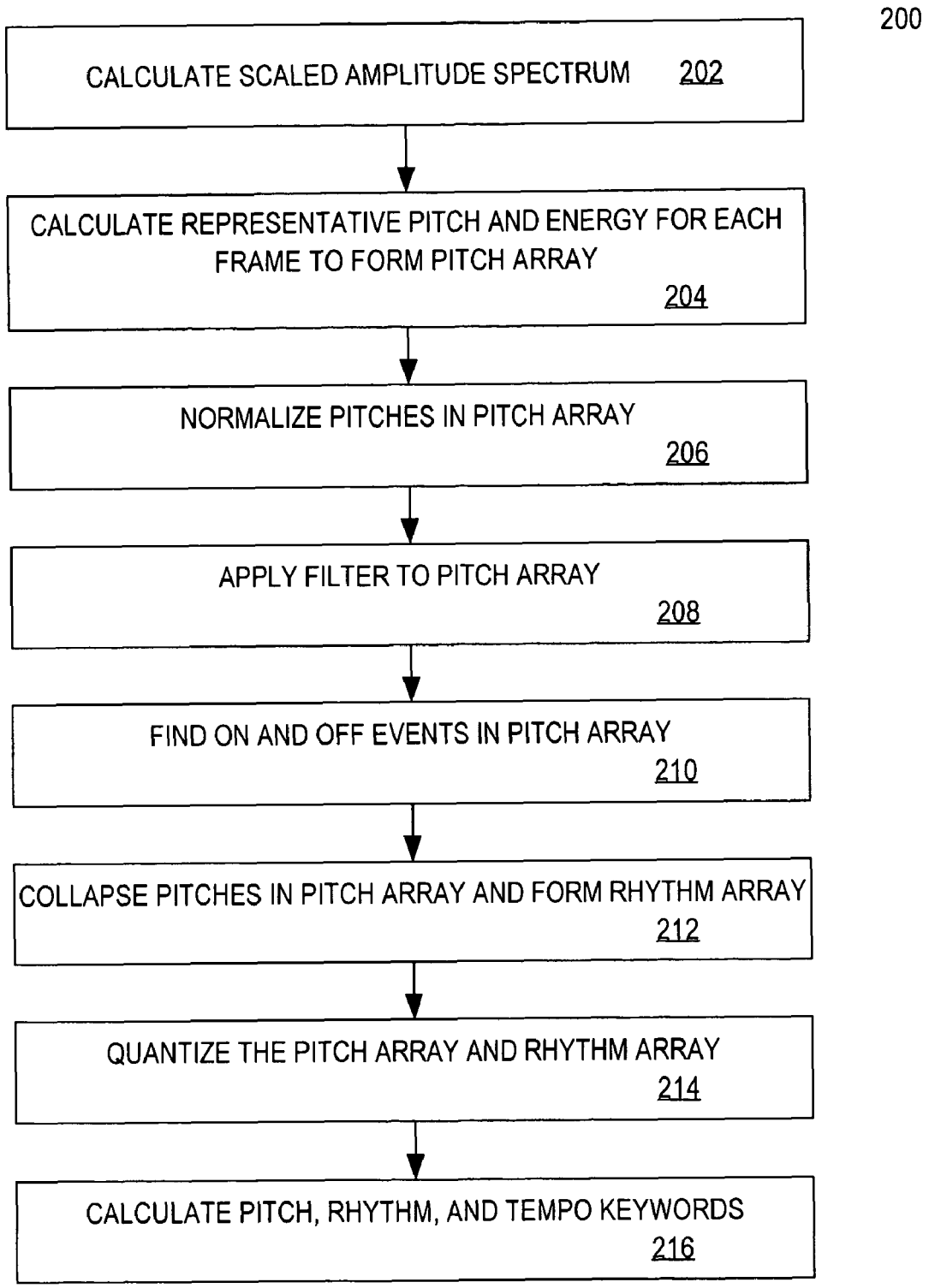
FIG. 2 is a flowchart illustrating steps of a process of forming keywords from audio data, in accordance with an embodiment of the present invention.

FIG. 2 is a flowchart illustrating steps of a process of extracting features and forming keywords from audio data sets, in accordance with an embodiment of the present invention. Process 200 describes feature extraction for audio data, which may be music, speech, or other audio data. In one embodiment, the audio data set is a song or portion thereof.

In block 202, a scaled amplitude spectrum is derived from the audio data set. The audio data set ("S") is divided into equal time frames. An overlapping hamming window may be used to generate the frames. An amplitude spectrum is then formed for each frame. For example, the magnitude of the Fourier transform of each frame gives the amplitude spectrum of the frame. A log of the amplitude spectrum may be taken. The log of the amplitude spectrum is then filtered by a filter bank to produce an array of amplitude responses per frame.

The filter bank comprises perceptually based filters, which emphasize frequencies that are expected to have more perceptual importance. In one embodiment, the filter bank comprises triangular band-pass filters. Each filter emphasizes a different frequency band. For example, each triangular filter has a different center frequency. In one embodiment, the frequency distribution of the center frequencies is substantially compliant with the Mel frequency scale. The Mel frequency scale may be used to approximate the frequency response of the human ear. The filter bank may be implemented with other than Mel filters. Thus, a perceptually-based filter bank can be applied to each frame to create multiple amplitude responses per frame.

The number of filters in the bank may depend upon the audio data being processed. For example, an embodiment that extracts features for use with an audio search engine, about twenty perceptually-based filters are used. However, any number of filters can be applied to each frame.

Thus, after applying the perceptually-based filters to each frame, the audio data set (S) has an abstract representation={A1, A2, Am}, where Ai is the scaled amplitude response for the i-th frame. Each frame (Am) has a value for each filter. Thus, each frame has the abstract representation Ai={ai1, ai2, . . . , aik}, where aik is the amplitude response for the k-th filter for frame i.

In block 204, a representative pitch and energy is calculated for every frame. Thus, block 204 comprises abstracting each frame (Ai) to a single pitch. From block 202, let every frame (A) be represented as: {a1, a2, . . . , ak}. The following describes a technique for finding a representative pitch and energy for a singe frame. First, array values (ak) with relatively low amplitudes are discarded. For example, all ak that are not within a certain distance of the highest amplitude are discarded. In one embodiment, all ak whose amplitude is within a certain percentage of the highest amplitude are kept and the others discarded. In one embodiment, all ak with an amplitude at least 0.8 times the highest amplitude are kept.

Next, a representative frequency is assigned to each filter used to establish the give array value. For example, if triangular filter was used in block 202, then the representative frequency may be the center frequency of the triangular filter. However, as is it not required that the filters be triangular, it is not required that the representative frequency be at the center of the filter. More generally, the representative frequency for each filter is any frequency that is designated are representing the range of frequencies passed by the filter.

The representative pitch for the frame may be defined as a weighted average of all the representative frequencies. A weighting of zero is assigned to all representative frequencies for which the associated array values (ak) have an amplitude that is not within a certain percentage of the highest amplitude, in accordance with one embodiment. The remaining representative frequencies can have any suitable weighting. For example, the weighting for each representative frequency is based on the amplitude of the associated array value (ak), in accordance with one embodiment.

The representative energy for each frame can be calculated as follows. The representative energy for a frame can be calculated as the arithmetic mean of all the amplitudes that were not discarded. However, the representative energy can be calculated by other than the arithmetic mean. At the end of block 204, the audio data set is represented as: {P1, P2, ..., Pm}, where Pi is the representative pitch for the i-th frame. Similarly, the audio data set also has a energy array: {E1, E2, ..., Em}, where Ei is the mean energy for the i-th frame.

In block 206, the pitches are normalized relative to pitches associated with previously processed audio data sets. For example, suppose that a database of previously processed audio data sets exists. Further, assume that the lowest pitch for any audio data set in the database is P_lowest. Every pitch (P) in the pitch array is replaced with P-P_lowest, in block 206.

In block 208, a filter is applied to the pitch array to remove error due to noise. For example, values in the pitch array are replaced by values calculated by performing a moving average of values in the pitch array. About three frames are averaged, in accordance with one embodiment. In one embodiment, the filter is a median filter. In another embodiment, the filter is a moving average filter.

In block 210, on and off events are found in the pitch array. A purpose of this is to find regions in the audio data set where some event happened. Since happening of an event may be characterized by a burst of extra energy, the pitch array is searched for regions characterized by a burst of extra energy.

As previously discussed, the pitch array for the audio data set may be represented {P1, P2, ..., Pm}, wherein Pi is the representative pitch for the ith frame. The energy array for the audio data set may be represented as {E1, E2, ..., Em}, wherein Ei is the representative energy for the ith frame. The energy array is searched for local maximum values. The pitch values corresponding to the local maximum energies is kept as intact, while other values in the pitch array are set to zero. The retained pitch values may represent events, while the other pitch values may be referred to as "off-event." Further, a value in the pitch array associated with a local maximum energy may be set to zero if the energy is below a given threshold.

In block 212, pitches in the pitch array are collapsed and a rhythm array is formed from the pitch array. Block 212 comprises merging adjacent pitches if the difference between the pitches is less then a threshold. A high threshold results in fewer merges. The value assigned to merged pitches may be the arithmetic mean, although another value could be used. The following example will help to illustrate. Suppose that the pitch array comprises the following values and the threshold for merging is two:

{0, 0, 0, 5, 0, 0, 0, 0, 0, 12, 13, 0, 21, 0, 0}

Merging adjacent values results in the following collapsed pitch array:

{0, 5, 0, 12.5, 0, 21, 0}

The following rhythm array is also formed:

{3, 1, 5, 2, 1, 1, 2}

Note that the first three array values in the pre-collapsed pitch array have been collapsed to a single value in the collapsed pitch array, and a three is placed in the first value in the rhythm array. The fourth array value in the pre-collapsed pitch array is not merged with any values because the value between the fourth value and adjacent values is greater than the threshold value. Since the fourth value is not merged, a one is placed in the second place in the rhythm array. The next five values in the pre-collapsed pitch array are merged, wherein a zero is placed in the collapsed pitch array and a five in the rhythm array. The value for the 12 and 13 in the pre-collapsed pitch array is averaged; wherein a 12.5 is placed in the collapsed pitch array and a value of two in the rhythm array. The rest of the array is processed in a similar fashion.

In block 214, the pitch and rhythm arrays are quantized. Block 214 may include splitting the range of pitch values into equal parts to form a set of bins. Each pitch value may then be placed into one of the bins. A similar process applies to the rhythm array. The quantization step can be performed in a different manner.

In block 216, keywords are formed. The pitch keywords may be formed as follows. From the pitch array {P1, P2, ..., Pn} (where n<=m) form overlapping subsequences of a certain length. For example, from the collapsed pitch array {0, 5, 0, 12.5, 0, 21, 0}, the following keywords of length four can be formed. The keyword can be other lengths. The amount of overlap is one value in the below example; however, another amount of overlap might be used.

{0, 5, 0, 12.5}
{5, 0, 12.5, 0}
{0, 12.5, 0, 21}
{12.5, 0, 21, 0}

The keywords for the rhythm array are formed in a similar fashion. In the following example, overlapping subsequences of length four were used to define the rhythm keywords; however the length is not required to be four, nor does the overlap need to be one value.

{3, 1, 5, 2}
{1, 5, 2, 1}
{5, 2, 1, 1}
{2, 1, 1, 2}

Tempo keywords may be formed from the pitch array as follows. A tempo array is created, which represents whether pitch is moving up or down. For example, if the pitch array is {10, 5, 20, 30}, then the corresponding tempo-array would be {−1, 1, 1}, where 1 donates increasing and −1 donate decreasing. Overlapping subsequences of values from the tempo-array may be used to define the tempo keywords in a similar fashion as forming the pitch and rhythm keywords.

Process 200 produces an abstract representation of the audio data set using the triplet tempo, pitch and rhythm keywords. For example, frames of audio data set are represented by a triplet as follows: S={(t1, p1, r1), (t2, p2, r2), ..., (tn, pn, m)}, where ti, pi and ri are the i-th tempo, pitch and rhythm keyword respectively. A composite keyword could be formed for each frame from any combination of the tempo, pitch and rhythm keywords. In one embodiment, a composite keyword is formed for each frame from the triplet of the tempo, pitch and rhythm. In one embodiment, three keywords are formed for each frame as represented by the tempo, pitch and rhythm keywords.

Determining a Distance Between Audio Data

Determining a distance between audio data is used to determine similarity between two audio data sets, in accordance with an embodiment of the present invention. The audio data sets are portions of two songs, in one embodiment. From features that are abstracted from the two audio data sets, the following two abstract representations can be formed:

S1={{(t1_1, p1_1, r1_1), (t2_1, p2_1, r2_1), ..., (tk_1, pk_1, rk_1)}

$S2=\{\{(t1\_2, p1\_2, r1\_2), (t2\_2, p2\_2, r2\_2), \ldots, (tk\_2, pk\_2, rk\_2)\}$ To find the distance between the S1 and S2, the tempo, pitch and rhythm values taken from S1 and S2 independently are clustered. For example, a tempo cluster is formed from all tempo values in the set S1 and the set S2. In a similar fashion, a pitch cluster is formed from all pitch values in the set S1 and the set S2. A rhythm cluster is formed likewise.

Next, a statistical variance of each cluster is determined. The distance can be defined as the weighted summation of all these variances. The weighting can be equal, but applying different weights may improve results. The weighting can be different depending on the audio content. For example, the pitch and rhythm information may be more useful than tempo information for identifying similar audio content. Therefore, the variances from pitch and rhythm clusters are given higher weights, in one embodiment. In one embodiment, the approximate weights to apply to the variance of the clusters prior to summation are as follows:

Temp 20
Pitch 60
Rhythm 80

Metadata, which is based on information such a song titles, artists, etc. may also be used in the distance calculation.

Indexing and Searching

Because content of the audio data set is represented as keywords, indexing techniques that are similar to those used for text/web documents may be used to create an index for the audio data set. For example, keywords are abstracted from songs and an index is created therefrom.

The index can be searched very efficiently for an audio data set that is similar to a reference audio data. For example, a user may supply a reference to a song. Keywords are created for at least a portion of the song, by extracting features from the audio content. The keywords are used to search the index for similar songs. Similar songs can be defined by a percentage of keywords that match.

Figure 3:
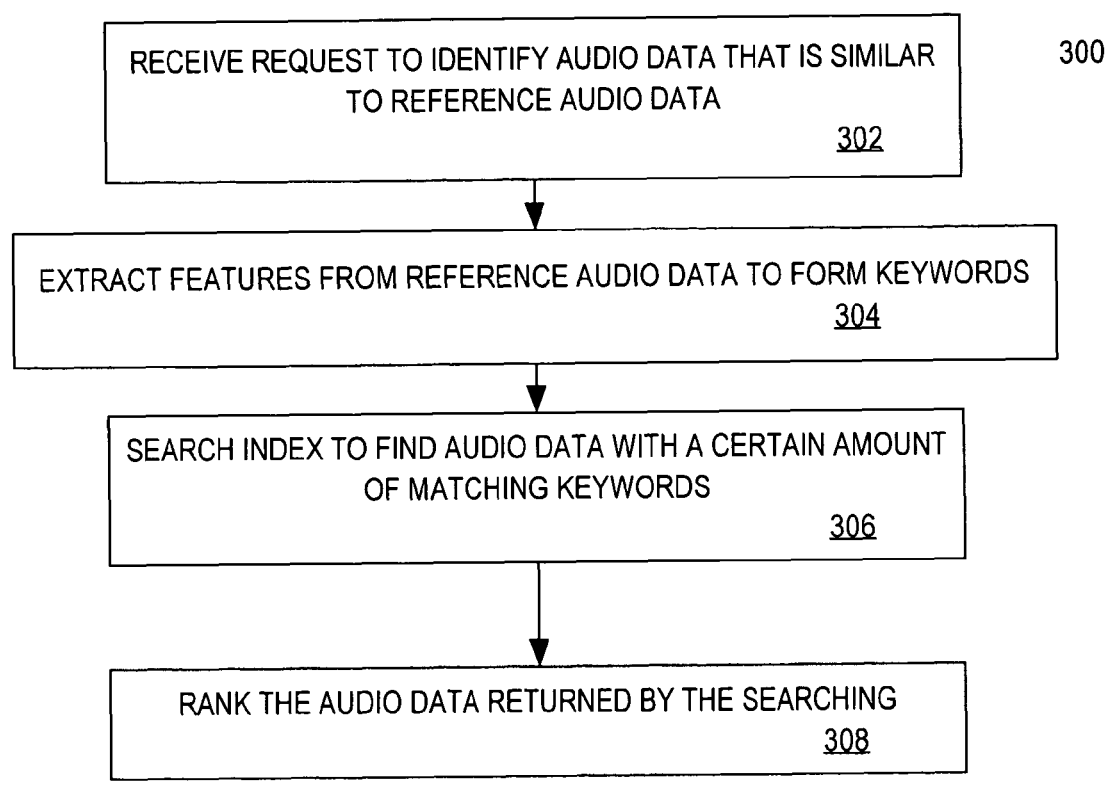
FIG. 3 is a flowchart illustrating steps of a process of searching for audio data that is similar to reference audio data, in accordance with an embodiment of the present invention.

FIG. 3 is a flowchart illustrating steps of a process 300 of searching for audio data that is similar to reference audio data, in accordance with an embodiment of the present invention. In block 302, a request is received to identify audio data that is similar to reference audio data. For example, a search engine receives a request that identifies a song. The request may identify other audio data, such as speech, or a sound. The reference may be a textual identifier, such as a song title, movie title, title or spoken book, television show, etc. The reference could also identify an audio file. For example, the request may contain a hypertext link where to find the audio data. Alternatively, the audio data might be attached to the request as an MPEG file or other audio data file.

In block 304, features are extracted from the reference audio data to form keywords. The keywords may include pitch, rhythm, and tempo keywords. In one embodiment, three keywords are formed for each frame as represented by the tempo, pitch and rhythm keywords. In one embodiment, a composite keyword is formed for each frame from the triplet of the tempo, pitch and rhythm.

In block 306, an index is searched to find audio data (e.g., one or more audio data sets) which has at least a certain amount of matching keywords. The index can be searched with keys formed from any combination of the pitch, rhythm, and tempo keywords. In one embodiment, the search is done with a composite keyword formed from the triplet of the tempo, pitch and rhythm. In one embodiment, the search is done with the individual tempo, pitch and rhythm keywords. If there are enough matches, then the audio data sets with the matching keywords in the index are selected. As an example, only the audio data sets for which at least 20% of the keywords from the reference audio data match are kept.

In block 308, the audio data sets returned by the searching are ranked in accordance with its similarity to the reference audio data. In one embodiment, a distance measure is used to rank the audio data sets. For example, a distance is calculated between the reference audio data and every audio data set returned from the searching using a distance measure described herein under the heading "DETERMINING A DISTANCE BETWEEN AUDIO DATA". In another embodiment, the audio data set are ranked according to the amount of keyword matches. For example, audio data set are ranked according to percentage of keywords in the reference audio data that match a given one of the audio data sets returned by the search.

Alternatives

Comparing audio data can be used to improve a comparison of non-audio content that is associated with the audio data. For example, consider a data set that comprises both video data and audio data. The audio data portion of this data set can be compared to the audio portion of other video/audio data sets to search for similar video/audio data sets. As an example, a video search engine can be improved by using the audio channel of a reference video/audio data set to search for audio channels that are similar. These results can be combined with results of comparison of the reference video channel with other video channels.

Comparing audio data can also be used to find individuals with similar audio interests. For example, an individual inputs audio references (e.g., song titles, musical artists, musical genres, musical instrument, etc.). Keywords are formed that represent the song, artist, genre, instrument, etc. Thus, a set of keywords are developed for the individual. The keywords are used to search for other individuals for whom similar keywords have been formed, thus indicating a possible similar interest in audio data.

Implementation Mechanisms

Figure 4:
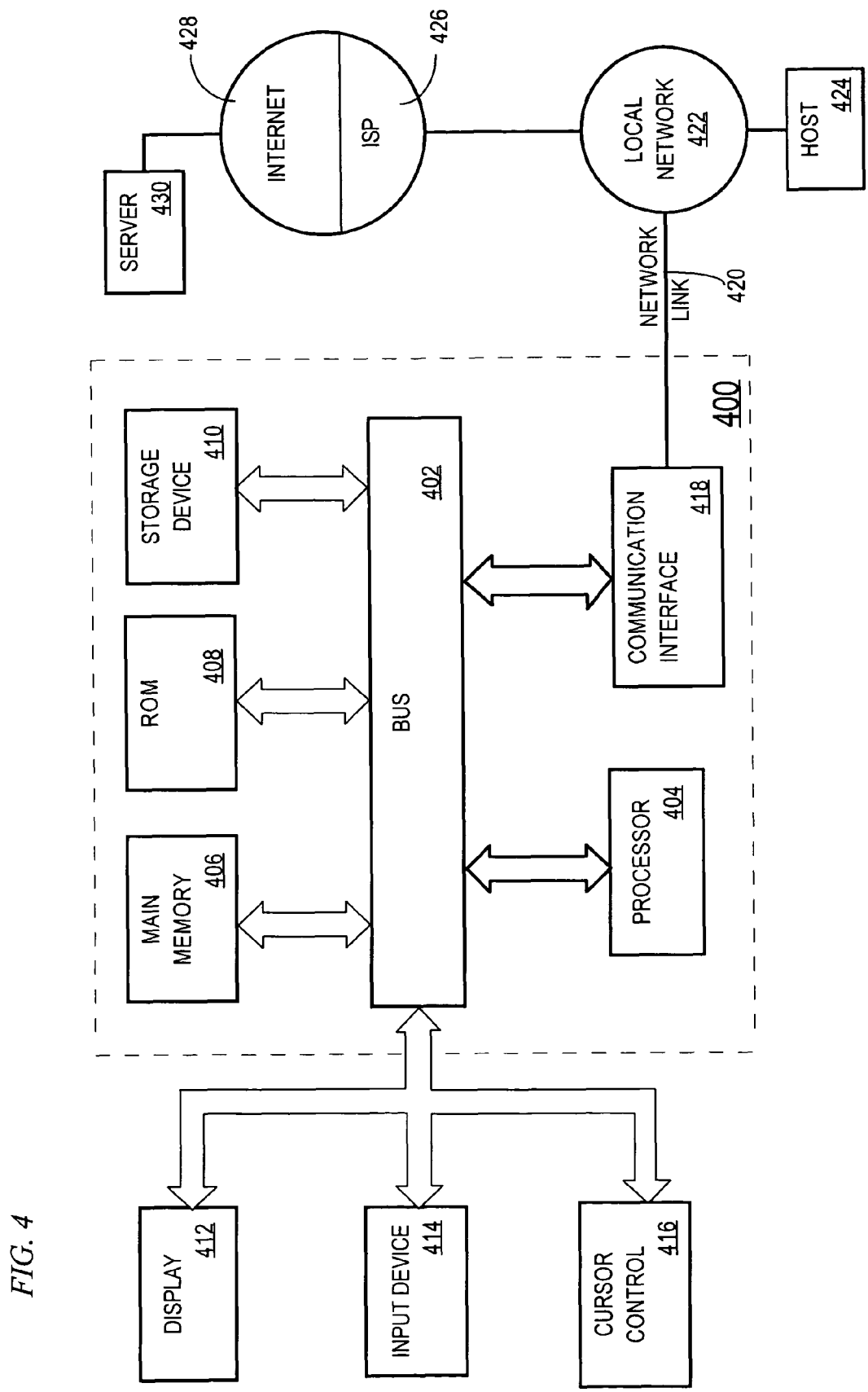
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are examples of forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method of searching for audio data using key-based searching, the method comprising:
   receiving a request to identify audio data having similar audio content to audio data specified in the request;
   forming a plurality of search keywords from audio content of the specified audio data;
   wherein forming the plurality of search keywords from audio content of the specified audio data comprises:
      extracting at least one feature from the audio content of the specified audio data to form feature arrays;
      forming a set of search keywords for each feature array by performing the following steps for each feature array:

forming keywords from overlapping sequences of values in the feature array, wherein each successive keyword comprises at least one value of a previous keyword and further comprises at least one value from the feature array that is not in the previous keyword;

searching an index comprising sets of keywords formed from audio content of audio data sets, the searching performed with the plurality of search keywords formed from audio content of the specified audio data to identify audio data having similar audio content;

wherein the computer-implemented method is performed by one or more computing devices.

2. A method as recited in claim 1, further comprising ranking audio data sets returned by the searching in accordance with a percentage of keyword matches.

3. A method as recited in claim 2, further comprising, prior to ranking the audio data sets, filtering out audio data sets returned by the searching based on a percentage of keyword matches between the specified audio data and respective ones of the returned audio data sets.

4. A method as recited in claim 1, further comprising:
determining a distance between the search keywords formed from audio content of the specified audio data and respective sets of keywords associated with the audio data sets; and
ranking the audio data sets in accordance with the determined distance.

5. A method as recited in claim 4, wherein determining the distance between the search keywords formed from audio content of the specified audio data and respective sets of keywords associated with the audio data sets comprises determining a statistical variance between the search keywords formed from audio content of the specified audio data and the respective sets of keywords associated with the audio data set.

6. A method as recited in claim 1, wherein the forming the search keywords comprises extracting pitch information from the audio content, wherein the search keywords comprise pitch keywords.

7. A method as recited in claim 6, wherein the forming the search keywords further comprises deriving rhythm information from the pitch information, wherein the search keywords comprise rhythm keywords.

8. A method as recited in claim 6, wherein the forming the search keywords further comprises deriving tempo information from the pitch information, wherein the search keywords comprise tempo keywords.

9. A method as recited in claim 1,
wherein said feature arrays comprise a pitch array and a rhythm array.

10. A computer-implemented method as recited in claim 9, wherein said forming keywords from overlapping sequences of values in the feature array comprises forming keywords wherein each successive keyword comprises all but the first value of a previous keyword and further comprises an additional value from the feature array that is not in said previous keyword.

11. A method as recited in claim 9, wherein the extracting features comprises:
extracting pitch information from the audio content;
determining events characterized by energy bursts in the pitch information; and
collapsing the pitch information by eliminating pitches that are not associated with an energy burst to form the pitch array.

12. A method as recited in claim 11, wherein the collapsing the pitch information to form the pitch array comprises merging adjacent values in the pitch information if the difference between the values is less then a threshold.

13. A method as recited in claim 12, further comprising forming the rhythm array from the pitch array by placing values in the rhythm array corresponding to the number of adjacent values in the pitch information that are merged in the pitch array.

14. A method as recited in claim 12, further comprising:
forming a set of tempo keywords for a tempo feature from overlapping sequences of values in the tempo array, wherein each successive tempo keyword comprises at least one value of a previous tempo keyword and further comprises at least one value from the tempo array that is not in the previous tempo keyword.

15. A method as recited in claim 9, further comprising:
creating a tempo array from the pitch array by:
comparing successive values in the pitch array to determine if the pitch is increasing or decreasing;
storing a first value in the tempo array if the pitch is increasing; and
storing a second value in the tempo array if the pitch is decreasing.

16. A method as recited in claim 9, wherein the extracting at least one feature from the audio content of the specified audio data to form feature arrays comprises:
dividing the audio content into a plurality of frames; and
calculating a representative pitch for each frame in order to form the pitch array.

17. A method as recited in claim 9, further comprising quantizing the pitch array prior to forming pitch keywords from the pitch array.

18. A method as recited in claim 9, further comprising quantizing the rhythm array prior to forming rhythm keywords from the rhythm array.

19. The method of claim 1, wherein the request references the audio data by at least one of a textual identifier or a hypertext link.

20. The method of claim 1, further comprising:
associating the sets of keywords with one or more individuals;
wherein said searching comprises searching, using said search keywords, for individuals having similar interest in audio data.

21. A non-transitory machine-readable medium carrying one or more sequences of instructions which, when executed by one or more processors, causes the one or more processors to perform the method recited in any one of claims 1-8 or 9-16.

22. A system for searching for audio data using key-based searching, said system comprising:
one or more processors; and
a computer-readable medium carrying one or more sequences of instructions, which when executed by said one or more processors implement a method of searching for audio data using key-based searching, said method comprising:
receiving a request to identify audio data having similar audio content to audio data specified in the request;
forming a plurality of search keywords from audio content of the specified audio data;
wherein forming the plurality of search keywords from audio content of the specified audio data comprises:
extracting at least one feature from the audio content of the specified audio data to form feature arrays;
forming a set of search keywords for each feature array by performing the following steps for each feature array:

forming keywords from overlapping sequences of values in the feature array, wherein each successive keyword comprises at least one value of a previous keyword and further comprises at least one value from the feature array that is not in the previous keyword;

searching an index comprising sets of keywords formed from audio content of audio data sets, the searching performed with the plurality of search keywords formed from audio content of the specified audio data to identify audio data having similar audio content.

23. A system as recited in claim 22, wherein said method further comprises:

ranking audio data sets returned by the searching in accordance with a percentage of keyword matches.

24. A system as recited in claim 23, wherein said method further comprises, prior to ranking the audio data sets, filtering out audio data sets returned by the searching based on a percentage of keyword matches between the specified audio data and respective ones of the returned audio data sets.

25. A system as recited in claim 22, wherein said method further comprises:

determining a distance between the search keywords formed from audio content of the specified audio data and respective sets of keywords associated with the audio data sets; and ranking the audio data sets in accordance with the determined distance.

26. A system as recited in claim 25, wherein determining the distance between the search keywords formed from audio content of the specified audio data and respective sets of keywords associated with the audio data set comprises determining a statistical variance between the search keywords formed from audio content of the specified audio data and the respective sets of keywords associated with the audio data set.

27. A system as recited in claim 23, wherein the forming the search keywords comprises extracting pitch information from the audio content, wherein the search keywords comprise pitch keywords.

28. A system as recited in claim 27, wherein the forming the search keywords further comprises deriving rhythm information from the pitch information, wherein the search keywords comprise rhythm keywords.

29. A system as recited in claim 27, wherein the forming the search keywords further comprises deriving tempo information from the pitch information, wherein the search keywords comprise tempo keywords.

30. A system as recited in claim 22, wherein said feature arrays comprise a pitch array and a rhythm array.

31. A system as recited in claim 30, wherein said forming keywords from overlapping sequences of values in the feature array comprises forming keywords wherein each successive keyword comprises all but the first value of a previous keyword and further comprises an additional value from the feature array that is not in said previous keyword.

32. A system as recited in claim 31, wherein the method further comprises forming a set of tempo keywords for a tempo feature from overlapping sequences of values in the tempo array, wherein each successive tempo keyword comprises at least one value of a previous tempo keyword and further comprises at least one value from the tempo array that is not in the previous tempo keyword.

33. A system as recited in claim 30, wherein the extracting features comprises:

extracting pitch information from the audio content;

determining events characterized by energy bursts in the pitch information; and collapsing the pitch information by eliminating pitches that are not associated with an energy burst to form the pitch array.

34. A method as recited in claim 33, wherein the collapsing the pitch information to form the pitch array comprises merging adjacent values in the pitch information if the difference between the values is less then a threshold.

35. A method as recited in claim 34, further comprising forming the rhythm array from the pitch array by placing values in the rhythm array corresponding to the number of adjacent values in the pitch information that are merged in the pitch array.

36. A system as recited in claim 30, wherein the method further comprises:

creating a tempo array from the pitch array by:

comparing successive values in the pitch array to determine if the pitch is increasing or decreasing;

storing a first value in the tempo array if the pitch is increasing; and storing a second value in the tempo array if the pitch is decreasing.

37. A system as recited in claim 30, wherein the extracting at least one feature from the audio content of the specified audio data to form feature arrays comprises:

dividing the audio content into a plurality of frames; and calculating a representative pitch for each frame in order to form the pitch array.

38. A system as recited in claim 30, wherein the method further comprises quantizing the pitch array prior to forming pitch keywords from the pitch array.

39. A system as recited in claim 30, wherein the method further comprises quantizing the rhythm array prior to forming rhythm keywords from the rhythm array.

* * * * *